(No Model.) 9 Sheets—Sheet 1.

G. CROMPTON & H. WYMAN.
LOOM FOR WEAVING TUFTED FABRICS.

No. 343,110. Patented June 1, 1886.

Fig. 1.

Witnesses
John F. C. Printlert
Henry Marsh

Inventors.
George Crompton
Horace Wyman
By Crosby & Gregory attys (No Model.) 9 Sheets—Sheet 3.

G. CROMPTON & H. WYMAN.
LOOM FOR WEAVING TUFTED FABRICS.

No. 343,110. Patented June 1, 1886.

Witnesses.
John F. C. Printkirk
Henry Marsh.

Inventors.
George Crompton and
Horace Wyman
by Crosby Gregory attys.

(No Model.) 9 Sheets—Sheet 4.

G. CROMPTON & H. WYMAN.
LOOM FOR WEAVING TUFTED FABRICS.

No. 343,110. Patented June 1, 1886.

Witnesses.
John F. C. Priestley
Henry Marsh

Inventors.
George Crompton and
Horace Wyman
by Crosby & Gregory attys (No Model.) 9 Sheets—Sheet 5.

G. CROMPTON & H. WYMAN.
LOOM FOR WEAVING TUFTED FABRICS.

No. 343,110. Patented June 1, 1886.

Witnesses.
John F. C. Prumbert,
Henry Marsh

Inventors,
George Crompton and
Horace Wyman
by Crosby & Gregory attys.

(No Model.) 9 Sheets—Sheet 7.

G. CROMPTON & H. WYMAN.
LOOM FOR WEAVING TUFTED FABRICS.

No. 343,110. Patented June 1, 1886.

(No Model.) 9 Sheets—Sheet 8.

G. CROMPTON & H. WYMAN.
LOOM FOR WEAVING TUFTED FABRICS.

No. 343,110. Patented June 1, 1886.

Witnesses.
John F. C. Reinhart
Henry Marsh

Inventors.
George Crompton
Horace Wyman
By Crosby & Gregory attys.

N. PETERS. Photo-Lithographer, Washington, D. C.

UNITED STATES PATENT OFFICE.

GEORGE CROMPTON AND HORACE WYMAN, OF WORCESTER, MASSACHUSETTS, ASSIGNORS TO SAID GEORGE CROMPTON.

LOOM FOR WEAVING TUFTED FABRICS.

SPECIFICATION forming part of Letters Patent No. 343,110, dated June 1, 1886.

Application filed July 2, 1884. Serial No. 136,604. (No model.)

*To all whom it may concern:*

Be it known that we, GEORGE CROMPTON and HORACE WYMAN, both of Worcester, county of Worcester, and State of Massachusetts, have invented an Improvement in Looms for Weaving Tufted Fabrics, of which the following description, in connection with the accompanying drawings, is a specification, like letters on the drawings representing like parts.

In looms heretofore made for weaving Moquette carpets or tufted fabrics the yarns for the production of the tufts for each different row of tufts entering into the pattern or design being woven have been taken from separate beams upon which the tuft-yarns have been wound, so as to present in proper sequence yarns of the particular colors which it was desired that the tufts should have in the transverse row of tufts to be made from the yarns on each beam. These numerous beams, each having the yarns wound thereon in different order as to color, and corresponding in number with the different transverse rows of tufts in the pattern, have been carried by moving chains, which have mechanically brought the different beams at the proper times forward to the cloth-making point, and the ends of the tuft-yarns have been drawn or placed between the backing or foundation warp-threads, or between and about the said warp-threads by different mechanical devices—such as hooks and needles—and the said tuft-yarns, having been caught near their ends in the fabric by a warp or weft thread, have been cut off, leaving tufts of the desired length, and thereafter each beam from which the tufts were so taken has been removed, and the next beam having the yarns properly graded as to color or arranged in different sequence has been brought into position for the next row of tufts across the fabric.

In the invention to be herein described the numerous tuft-yarn beams heretofore used are dispensed with, the time heretofore required to wind the yarns of different colors on the different beams in the different orders as to colors is saved, the cost of the chain and mechanism to move it and to take the beams from the chain is saved, and the power to move all the said parts is not required. The saving of chain and power to move it is very considerable, and the longer the pattern the more the saving.

In the loom herein to be described the tuft yarns or threads of the different colors to be employed are wound, each yarn by itself, on a separate spool, and the said spools are held in frames at the rear of the loom, as are the spools when weaving Wilton and Brussels carpets. The tuft-yarns are led singly from the spools through eyes in independent vertically-movable tuft-yarn carriers or needles arranged in series in carriages, each tuft-yarn carrier or needle being controlled by a Jacquard mechanism, by which it is raised and lowered at the proper times. As herein shown, the said tuft-yarn carriers or needles are each attached directly to a jacquard-cord, so that any one of a series of carriers or needles, each having a tuft-yarn of a different color, may be lowered below the remaining carriers or needles of the series, to present above the warp a yarn of proper color for each tuft in the series of tufts to be made across the fabric, and thereafter the set of dropped or selected carriers or needles extending across the warp from selvage to selvage are suitably acted upon by evener mechanism, the purpose of which is to place all of the said dropped or selected carriers or needles in the same line or row across the loom or fabric, thus placing the desired needle of each carriage (the said needle having yarn of the color desired for the next tuft to be made by a yarn from a needle of that carriage) exactly at the point where the tuft of that color is to be inserted in the row of tufts then to be made. There are as many series of tuft-yarn carriers or needles as there are to be tufts in each row of tufts across the fabric, and the number of carriers or needles in each series will depend upon the number of colors to be shown in each longitudinal row of tufts entering into the pattern.

The improved tuft-yarn carriers or needles referred to are herein shown as embodied in a loom having many parts, substantially such as represented in United States Patent No. 245,259, dated August 2, 1881, to which reference may be had; and herein, to avoid confusion and the making of complex drawings, many of the parts of the said patented loom which will be employed in the improved loom to be herein described will be omitted; but enough of the said parts have been shown to enable this invention to be understood, and the parts hereinafter mentioned as designated by the same letter are substantially the same and may be actuated substantially as are the said like parts in the said patented loom.

We desire it to be understood that the tuft-yarn carriers or needles herein described may be employed in other mechanical organizations for the production of Moquette carpets or tufted fabrics wherein the tuft-yarns held by the carriers or needles and presented to the warp-threads are thereafter placed between or about the warp-threads, or are locked or caught by the filling or weft-thread.

The lower ends of the tuft-yarn carriers or needles herein described, if desired, may be made to present the ends of the tuft-yarns to clamps, and the yarns then cut off in short lengths may be transferred by the said clamps into position between the warp-threads to be caught and held by the weft.

The employment of independently-movable carriages and a series of tuft-yarn carriers or needles or tuft-yarn passages in each carriage in connection with pinchers or with clamps, as referred to, is not herein claimed, as it forms the subject-matter of other applications made by us, Serial Nos. 179,213 and 142,487, to which reference may be had.

One essential feature of this present invention consists in the employment of tuft-yarn carriers or needles each of which is separately controlled by a jacquard-cord, each series of tuft-yarn carriers or needles being controlled by a carriage, so that any one tuft-yarn carrier or needle of each series which shall have been selected for use may, by suitable eveners, be placed in such position with relation to the warp-threads that the free ends of the tuft-yarns carried by the said carriers or needles may be so placed with relation to the warp as to enable the said tuft-yarns, at a short distance from their free ends, to be locked into the body of the fabric, after which the tuft-yarns will be cut off, leaving a staple-like tuft. Although it is preferred to pass the ends of the tuft-yarn carriers or needles through between the warp-threads, it will be understood that the said independently-controlled tuft-yarn carriers or needles, in turn controlled in series by carriages, may have the free ends of the separate tuft-yarns carried by them and taken each from a different spool passed into the shed of the warp by any well-known or suitable mechanism commonly employed to introduce the ends of the tuft-yarns into the shed of the warps. As to the carriages, it is only essential that each carriage should be able to control and keep together several tuft carriers or needles as a series and permit individual carriers or needles of each series to be moved or brought into line as a set by evener bars or rods, which at the proper times are moved toward each other above the warp-threads, the said eveners acting to place such of the tuft-yarn carriers or needles as shall have been permitted by the jacquard to fall below the fellow carriers or needles of the series in which they operate all in one line, no matter what may be their position in the series, bringing them all into line above the warp and in a row across the said warp opposite where the next longitudinal row of tufts is to be inserted or made. We denominate the row of needles dropped below their fellows as a "set," each set of needles thus being composed of one needle from each series of needles, the number of needles in the set corresponding with the number of tufts in a transverse row of tufts.

Fig. 4 is a sectional detail, mostly on the line $x'\ x'$, Fig. 3, to represent part of the evener mechanism and of the tuft-cutting mechanism and part of the means for operating the same, the breast-plate and its support being in section, the shaft $a^{14}$ being, however, cut at one side of its center to show the cam thereon which operates the cutter. Fig. 5 is a side elevation of one of the carriages with its series of tuft carriers or needles, one of the latter being shown as dropped or selected for use, the said carriage being viewed from the right of the line $x^2\ x^2$, Fig. 3. Fig. 6 is a section of Fig. 5 on the dotted line $x^3\ x^3$; Fig. 7, a longitudinal section of Fig. 5 in the dotted line $x^4$; Fig. 8, an edge view of the carriage alone suspended from its supporting-rod; Fig. 9, a vertical section of the bottom bar of the carriage in the line of the opening therein which guides a carrier or needle. Fig. 10 shows two views of one of the tuft carriers or needles enlarged, the lower end of the needle being broken out in one of the views to show the tuft-yarn; Fig. 11, a top view of one of the needles; Fig. 12, a section thereof in line $y\,y$, Fig. 10; Fig. 13, a right-hand side elevation of the jacquard, the same being shown as set upon the side of the upper part of the loom-frame, and supposed to be broken off from Fig. 1. Fig. 13$^a$ is a detail showing part of the frame and the hook and lantern-pinion of the jacquard-cylinder which carries the chain of cards; Fig. 14, a vertical sectional enlarged detail of the jacquard, it being shown as having two sets of cords, the other cords like them being omitted. Fig. 15 is a view of the parts shown in Fig. 13, looking at them from the left; Fig. 16, a top view of part of the trap-board; Fig. 17, a top view of part of the top board; Fig. 18, a partial section of Fig. 17 with cords added; Fig. 19, a partial section of Fig. 16 with cords added; Fig. 22$^a$ is a detail of the breast-plate and one of the cutters, and Fig. 22$^b$ is a section of Fig. 22$^a$ in the line $x^6\,x^6$. Fig. 23 is an enlarged detail of one of the eveners. Fig. 24 is a detail illustrating a modified form of needle-carriage and needle, together with eveners and some co-operating parts to be described. Fig. 25 is a front view of the modification shown in Fig. 24, the breast-plate being omitted; Fig. 26, a side elevation, on a larger scale, of one of the tuft carriers or needles removed from Fig. 24, the needle being broken out at places to show its construction and to save space on the drawing. Fig. 27 is a view of Fig. 26, looking at it from the left. Fig. 28 is a sectional detail showing a part of one of the carriages used in Fig. 25, its support, and one of the needles.

Figure 2:
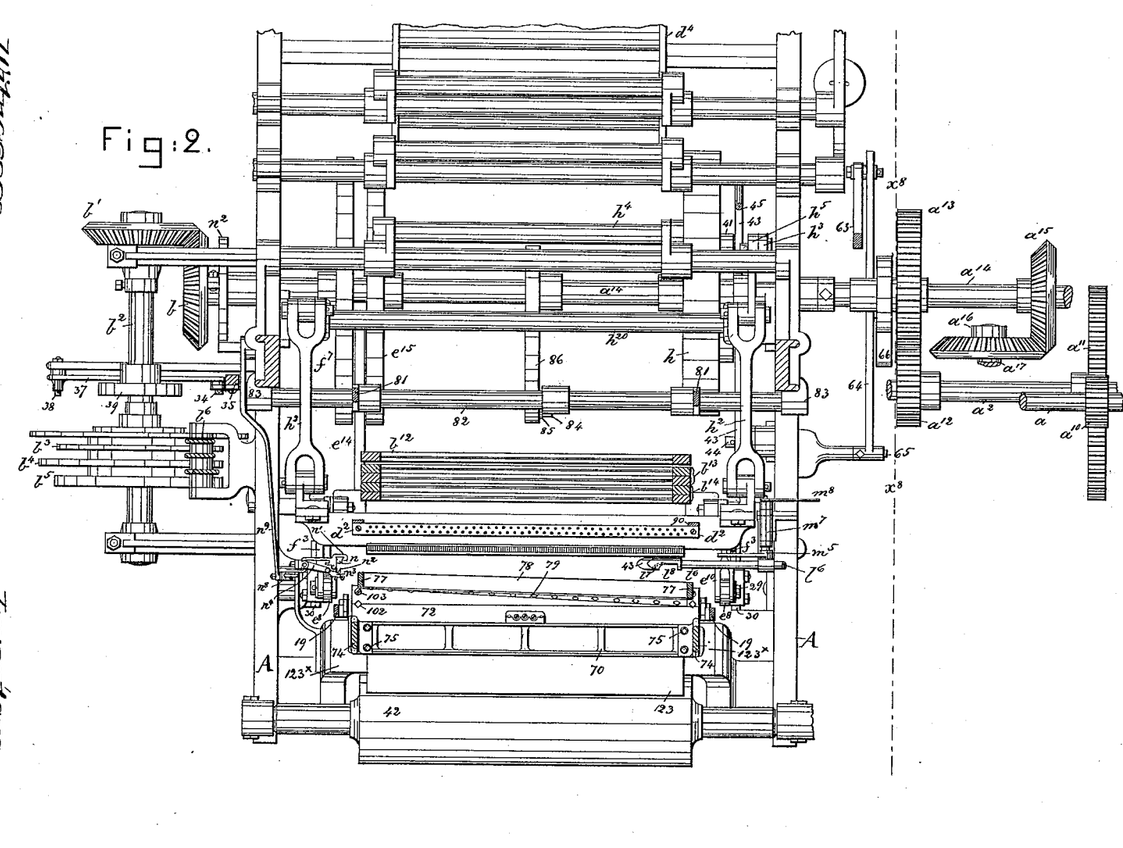
Fig. 2 is a section below the line $x\ x$, Fig. 1, of a sufficient portion of the loom to be described to enable our invention to be understood when taken in connection with the loom described in United States Patent No. 245,259, granted to us August 2, 1881.
Figures 13, 13A, 14, 15, 16, 17, 18, 19:
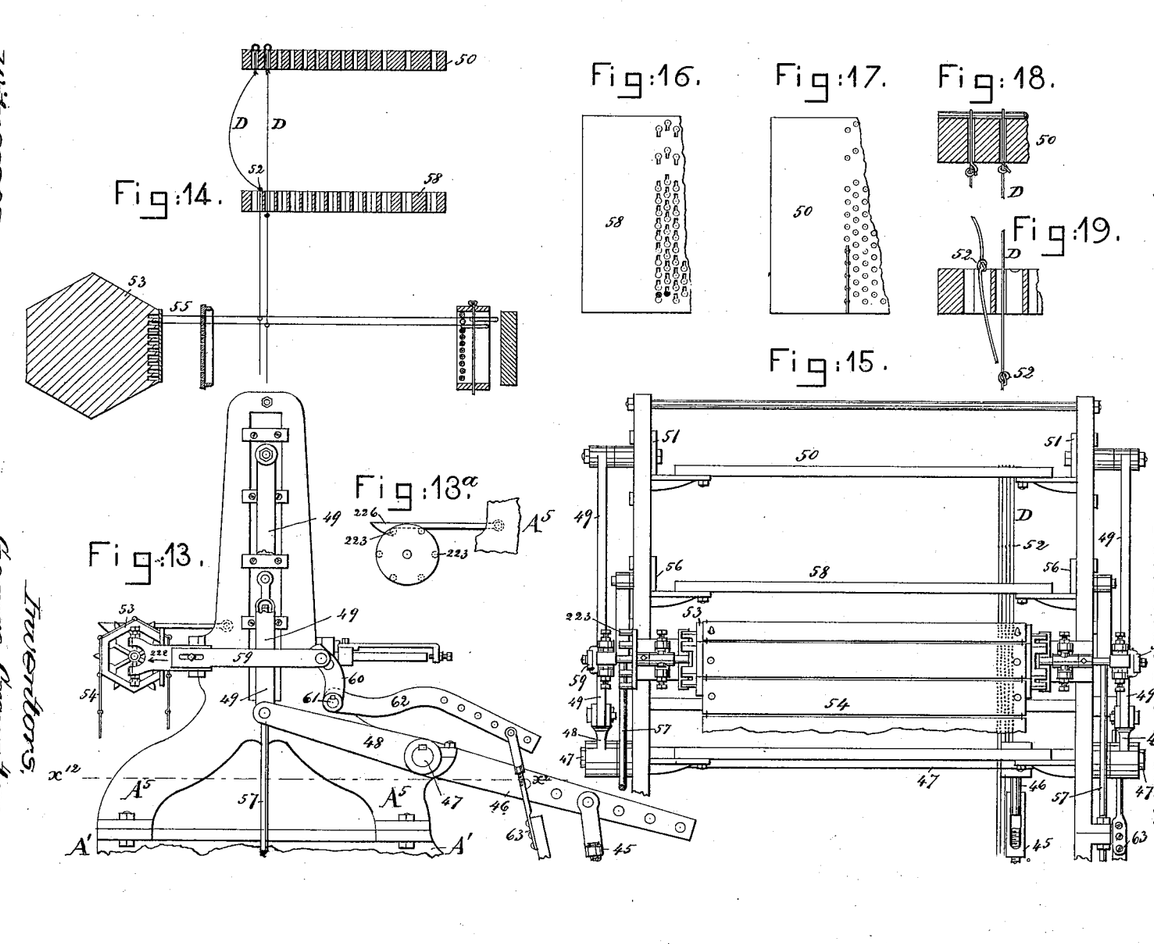
Figure 20:
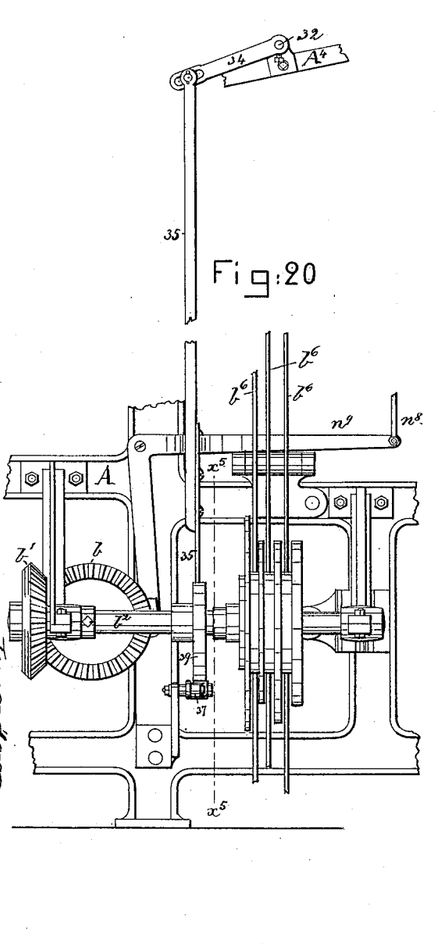
Fig. 20, a detail of the left-hand end of the loom shown in Fig. 1.
Figure 21:
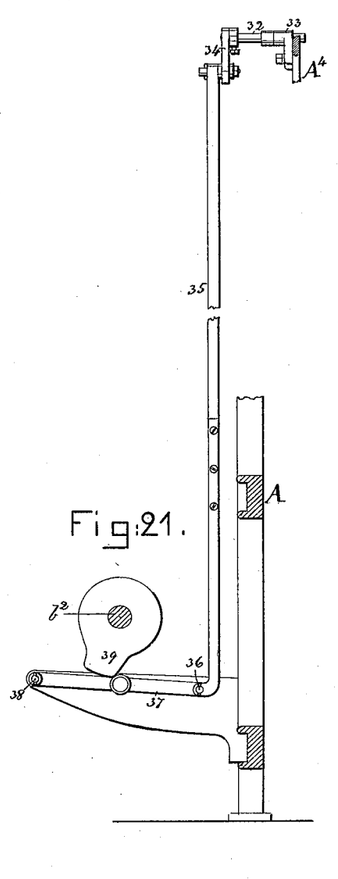
Fig. 21, a section of only the parts immediately at the left of the dotted line $x^5\,x^5$, Fig. 20.
Figure 22:
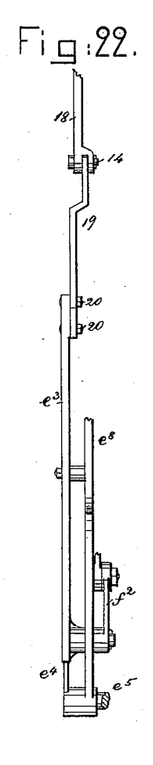
Fig. 22, a detail showing one of the guides and devices mounted thereon which actuate a rod or shaft which forms part of the mechanism for supporting the carriages for the tuft carriers or needles, and for raising and lowering the latter all together with the evener mechanism.
Figure 22A:
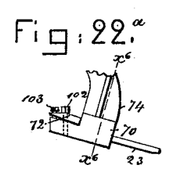
Figure 22B:
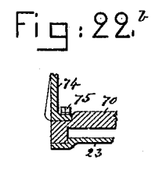

The fabric to be produced on the loom herein described will be the same as that described in United States Patent No. 245,259. The frame-work A, to support the main working parts, the uprights A' A', to support the jacquard-head A$^5$, (shown by itself in Figs. 13 to 15,) and the standards A$^2$, to support the two balanced levers A$^4$, to be described, having attached weights 120, may be of any usual shape. The driving or pulley shaft $a$, Fig. 2, pinion $a^{10}$ thereon, the shaft $a^2$, toothed gear $a^{11}$ and pinion $a^{12}$ thereon, toothed wheel $a^{13}$, cam-shaft $a^{14}$, bevel-gear $a^{15}$, bevel-gear $a^{16}$, shaft $a^{17}$, having cams to actuate the filling-needle $l^6$, bevel-gear $b$ at the end of shaft $a^{14}$, bevel-gear $b'$, shaft $b^2$, cams $b^3\,b^4\,b^5$, to actuate heddle-levers $b^6$, (shown partially in Fig. 20 and in section Fig. 2,) harness-cording $b^9\,b^{10}$, harness-frame $b^{12}$ for the stuffing-warp 21, the double harness-frames $b^{13}\,b^{14}$ for the regular warps 8 and 9, the heddles 22 23 24, warps 8 and 9, the warp-rollers $d^3\,d^4$, stuffing-warp beam $h'$, whip-rollers over which the said warps are passed, lay-swords $d^2$, pivoted at $e^5$, cam $h$, crank-lever $h^5$ on the crank-shaft herein designated $h^{20}$, links $h^2\,h^3$, and lever $h^{21}$, pivoted at $h^{22}$, and having a roller-stud to enter the groove of cam $h$ to operate the lay, the rock-shaft $f$, its arms $f^3$ at each side of the loom, their connected links $f^2$, the upwardly-extended slotted arm $e^8$, provided with guides $e^4$, (see Figs. 21 and 22,) and also pivoted at $e^5$, the lifting devices $e^3$, mounted to slide on the said guides, the guides 30, one attached to the interior of the loom-frame at each side of the loom, the lips 29 of arms $e^3$, embracing the said guides, the links $e^{10}$, the arms $e^{12}$ and $e^{14}$ of the sleeve $e^{13}$, the cam $e^{15}$ (see Fig. 2) to actuate the said sleeve, the link $f^5$, cam $f^7$ to actuate a radius-bar, (not shown, but pivoted upon the loom side and connected to the end of the said link $f^5$,) the arm $f^4$, the take-up roller 42, the filling-needle $l^6$ and its parts marked $l^3$, $l^7$, and 43, and means to operate the said filling-needle, the coarse-thread controller $m^5$, bearing $m^7$ therefor, arm 55, link $m^8$, means to move the latter and the said thread-controller, weft-bobbins $l'\,m'$, shuttle $n$, raceway $n'$, shuttle-moving carriage $n^4$, link $n^8$, lever $n^9$, and cam $n^2$ to move the said shuttle at the proper times, are all substantially the same as in our patent referred to, wherein the parts mentioned are represented by like letters, except that herein the bevel-gear $a^{15}$ is moved farther out on its shaft to engage the outer side of the gear $a^{16}$ rather than its inner side, as described in the said patent. The tuft-yarns $t$ are wound upon separate small spools B, one for each tuft-yarn and tuft carrier or needle, which spools are held loosely in frames B', of suitable size, sustained by uprights B$^2$ at the rear of the loom-frame, the number of spools held by the different frames being in practice determined by both the number of tufts and the variety of colors to be employed in the production of a transverse row of tufts, the spools in each of the different frames B' containing single yarns differing in color. The frames B' will be placed at such distance at the rear of the loom-frame as to permit the tuft-yarns to be led from the spools to the guide-eyes 15 of the series of tuft carriers or needles $c\,c'\,c^2\,c^3\,c^4\,c^5$, each carrier or needle having one such receiving-eye at a point above its delivering-eye 13, the receiving-eyes of the different carriers or needles being located at different distances from the points of the needles, so as to lessen the liability of friction between the tuft-yarns entering the different needles of each series.

Herein we have shown six carriers or needles in each series; but the number in each series may be greater or less, and it will be understood that there will be as many series of needles as there are to be tufts in each row of tufts across the fabric. We have practically demonstrated that very complex and varied patterns containing numerous colors may be produced by but six needles in each series. The tuft-yarn carriers or needles of each series are at their upper ends connected with any usual jacquard-cords, D, and at their lower ends are placed in and under the control of carriages E, there being one carriage for each series of tuft-needles, the latter being raised and lowered in guides in the said carriages by the jacquard-cords. The needles controlled by each carriage are placed one behind the other in the direction of the length of the fabric being woven, and the carriages are free to be moved in the same direction.

As herein shown, the upper portion of each needle is composed of wire provided with an eye, 15, to receive the jacquard-cord, and the lower part of the needle is of sheet metal bent partially upon itself, as most clearly shown in Figs. 10, 12, and 26, 27, and brought together at its lower end to form a wedge-point, and provided with a delivery-eye, 13; but we desire it to be understood that we do not intend to limit our invention to any exact form of needles, for herein we have shown two different needles, each the equivalent of the other.

Referring to Figs. 5 and 10, where the needles employed in Figs. 1 and 3 are shown on a larger scale, it will be seen that the body of the needle above the sheet-metal part is composed of two wires, and that each needle at a point above its yarn-delivering eye 13 is provided with a projection or lug, 12, which when the jacquard permits the needle to fall meets the carriage, and thereafter while the said needle is being moved to insert its contained yarn into position with relation to the warp for the production of a tuft the said needle is supported directly by the carriage, while the remaining needles are supported by their attached jacquard-cords, the knots 52 of which are above the slots in the trap-board 58. It will be noticed in Figs. 5 and 10 that the projections 12 are all at the same distance from the points of the needles, the said projections thus acting as gages to control the distances to which the lower ends of the needles may descend below the carriages.

In Figs. 5 and 10 we have provided the needles $c$ to $c^4$, above the projection 12, with yarn-receiving eyes 15; but in the case of the needle $c^5$ we have made the projection 12 and yarn-receiving eye as one; and it will be noticed that all the said eyes in each series of needles are at different distances from the points of the needles, so as to permit the tuft-yarns entering the eyes 15 of the different needles of each series to enter between the carriages one above and out of contact the one with the other.

The needles shown in Figs. 5 and 10 are placed in grooves in a carriage, E, made sector shape (see Figs. 5, 7, and 8) and loosely supported or pivoted upon a rod, $17^\times$, the said carriage having a rest, 17, and a guide-bar, 16, the former to receive against it the projections 12 and the latter to guide the needles, the rest 17 also, as herein shown, guiding the needles near their upper ends, the said carriages being free to be moved backward and forward by the evener mechanism, to be described, as the latter acts against the needles which the jacquard permits to descend, so that their projections 12 rest on the carriages.

The modified form of needle shown in Figs. 24 to 27 has but one wire for its body, and the yarn-receiving eyes 15 are made as rings secured to the bodies of the needles, and the projections 12 are placed lower down on the needles or at the upper ends of the sheet-metal parts thereof. The carriages E to receive these modified needles are somewhat altered, as shown in Figs. 24, 25, and 28, and are made as will now be described. Instead of using a sector-like carriage for each series of needles, we have shortened or cut away the rod $17^\times$, to be hereinafter more fully described, and have fastened to it just within the path of movement of the vertical arms of the evener mechanism, at each side of the loom, a depending frame, $p$, and we have rigidly connected the loose ends of these two frames by means of two notched bars or supports, 109, and in notches in the said bars we have placed the carriages E, shown in their modified shape as metal bars, each having pins $c^3$ projecting from one side thereof, or having at their sides suitable pockets, or it might be spaces made by notching the sides of the said bars, the said pockets or spaces receiving and guiding the lower ends of the tuft carriers or needles.

In Fig. 24 the pins shown are supposed to be in section, the said pins being supposed to be cut off from the carriage which controls the series of needles therein shown.

Fig. 28 shows an enlarged top view of part of a carriage with pins extended from it in the proper direction, and as in actual work. These bar-shaped carriages are free to slide parallel each with the length of the warp-threads in the notches in the bars 109, and are held down in the said notches by cross-bars or caps 107. When the needles shown in Figs. 24 and 25 drop, the projections 12 rest on the tops of the bar-like carriages.

Figs. 24 and 25 show a set of four dropped or selected needles, the needle $c'$ of each series of needles being, it is supposed, dropped for use.

Figure 3:
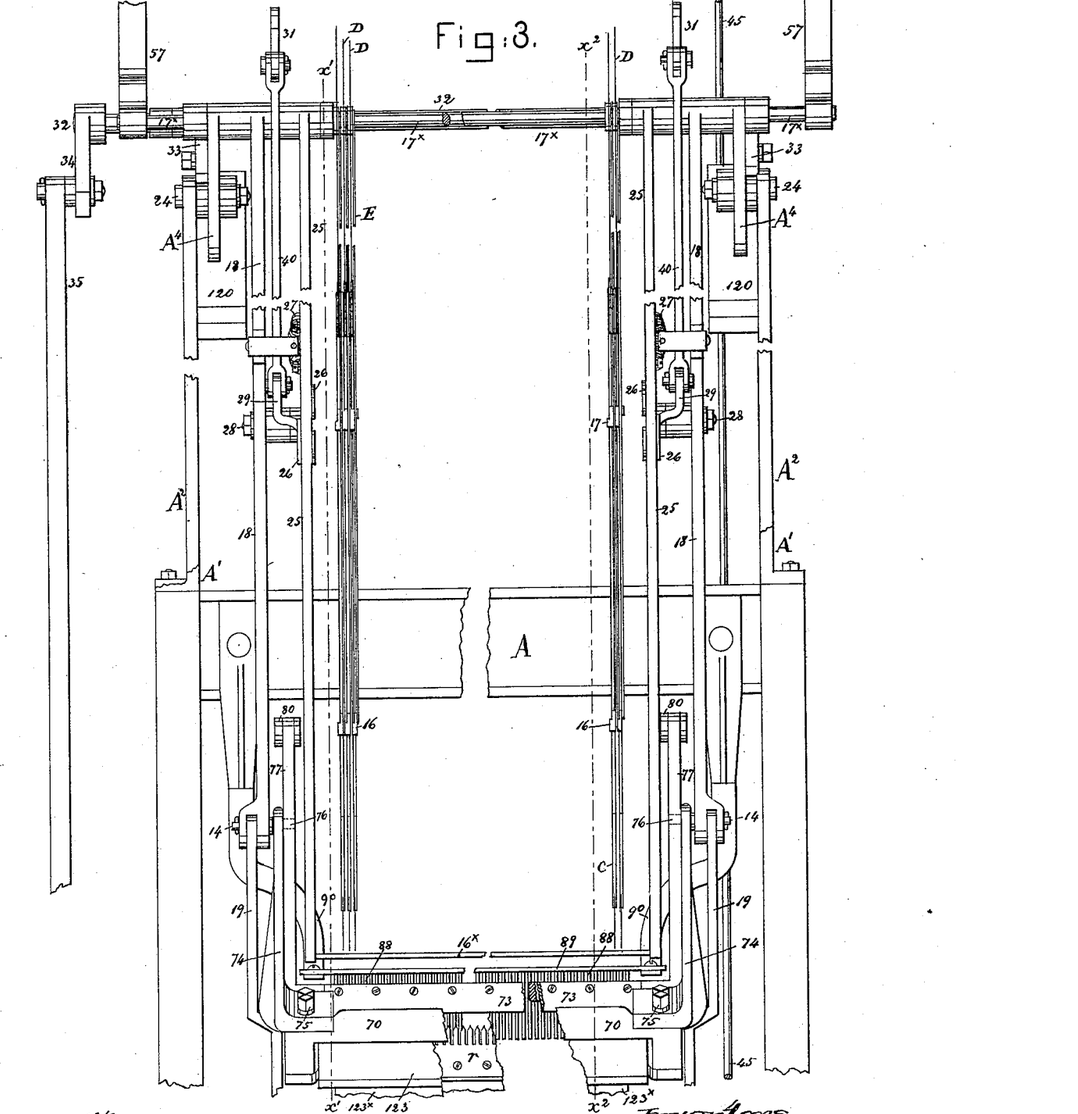
Fig. 3 is a partial front elevation of the loom from a point a little below the breast-plate support nearly to the Jacquard machine, all but five of the needle carriages being omitted and parts of the loom being broken out centrally to shorten the same in the direction of its width.
Figure 31:
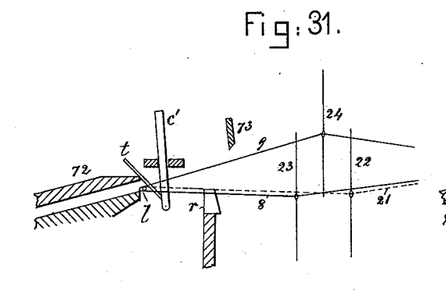
Figure 32:
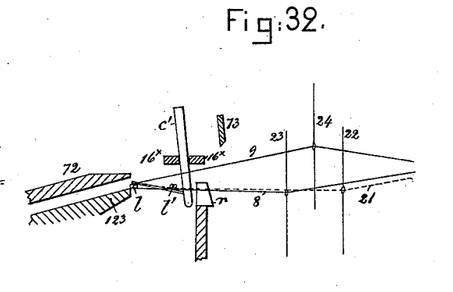
Figure 33:
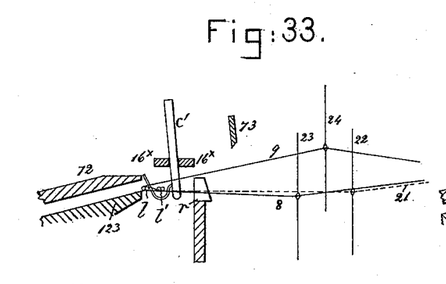

In the modification, Figs. 24 and 25, the guide 17 for the upper ends of the needles is connected with the rods 57 at opposite sides of the loom, and is shown as a long board provided with holes, one for each needle of each series of needles from side to side of the loom. One needle having been selected from each series of needles and dropped to form the set of needles to be used in the formation of the next row of tufts to be made, the said dropped needles are acted upon by the eveners, which are moved toward each other from opposite directions, as will be described, and all the needles of the set are brought into line across the warp. The needles which are selected and dropped or lowered for use are thereafter supported, as herein shown, directly by the carriages, and the eveners in their movement to engage the said needles and place them in line pass under those needles of each series of needles which are held up by the jacquard-cords. As the needles to be used are brought into line the carriages are also moved, and the needles come into line from opposite directions, the carriages being moved different distances, according to which needle of each series was lowered, and thereafter all the needles thus selected to be used in the production of the next row of tufts are lowered and moved together in unison by the movement of the devices which support the carriages, the evener mechanism at such time acting to keep all the selected or lowered needles in line to act as a unit, each inserting a tuft of the particular colored yarn carried by it. The rod $17^\times$, (see Figs. 3, 4, 5, and 7,) on which the sector-like carriages E, before described, are pivoted loosely, has its journals mounted in the upper ends of arms 18, jointed at 14 to the upper ends of rigid arms 19 at opposite sides of the loom, each arm 19 being bolted, as at 20, to the upper end of one of the lifters $e^3$, (see Fig. 22,) placed on the guides $e^4$, connected with and located next the inner sides of the arms $e^8$, the said guides and arms having their fulcra on the rod $e^5$, and the said lifters being reciprocated on the said guides by the links $f^2$ and arms $f^3$, connected with the rock-shaft $f$, the latter having other arms, $f^4$, and being actuated as described in the aforesaid patent. The arms $e^8$ and guides $e^4$ are vibrated about their fulcra by the sleeve $e^{13}$, arm $e^{12}$, and link $e^{10}$, connected with the arms $e^8$, all as in the patent referred to, the said arms being moved away from the breast-plate or cloth-support 123, mounted on the cross-arch $123^\times$, as the lifters and their connected eveners and carriages, with their tuft-carriers or needles, descend, thus enabling such of the tuft-carriers or needles as have been lowered to pass diagonally down through and between the warp-threads (see Fig. 31) and form in the tuft-yarns $t$ suitable loops, as shown in Figs. 32 and 33, for the entrance of the filling-thread carrier $l^6$, which is just the same as in the said patent, the said needles, as the arms $e^8$ are moved in the opposite direction or toward the breast-plate, being elevated above the warp, after which the tuft-yarns held in the fabric are cut off, as will be described. The rod $17^\times$, held in bearings at the upper ends of the bars 18, also has bearings in the ends of levers $A^4$, pivoted at 24 on the standard $A^2$, erected on the loom sides A, the said levers being provided with suitable counterbalancing-weights, 120, the main purpose of the said levers being to act as a guide for the bars 18 in their up and down movements. The rod $17^\times$ has pivoted upon it the arms 25, which latter in this instance carry the eveners $16^\times$ at their lower ends, the acting faces of which (see enlarged detail, Fig. 23) will preferably have recesses to receive the thin edges of the needles when they are dropped, as stated, to be used, thus preventing lateral movement of the said needles with relation to the spaces between the warp-threads, there being a notch for each series of needles. The arms 25, as herein shown, are normally moved toward each other, or in closed condition against the rocker 26, by suitable springs, 27, (see Figs. 3 and 4,) attached to the said arms and to brackets 121. The rockers 26, pivoted at 28 on the bars 18, have each a projecting arm, 29, which has jointed to it a link, 40, attached to the arm 31 of a rock-shaft, 32, placed loosely in bearings 33, attached to the levers $A^4$, there being two such levers, one at each side of the loom-frame. The rock-shaft 32 has at the left side of the loom a third arm, 34, which has attached to it a link, 35, jointed at its lower end at 36 (see Fig. 20) to a lever, 37, pivoted at 38, the said lever having a roller or other stud which is acted upon by a cam, 39, on the shaft $b^2$. The said cam is so shaped as to operate the rockers 26 to separate the arms 25 and their attached eveners just before the tuft-yarn carriers or needles next to be used are to be selected and dropped by the Jacquard machine into and so as to be supported by the carriages, as described. Thus the said eveners, when permitted to approach each other under the action of the springs 27 or otherwise, are enabled to meet the lowered tuft-yarn carrier or needle of the series held by each carriage, and, acting against the said dropped tuft-yarn carriers or needles, bring them, it may be from opposite directions, all into the same line across the warp-threads, thus bringing that one of the said carriers or needles of each series which contains the proper colored yarns for the tufts which the said dropped set of tuft-yarn carriers or needles is to make in the next transverse row of tufts into the same line, to be thereafter moved in unison as a set, for the simultaneous introduction of the tuft-yarns and the formation of loops from them, and keeping them in the same line while the said loops are being cut off.

Figure 1:
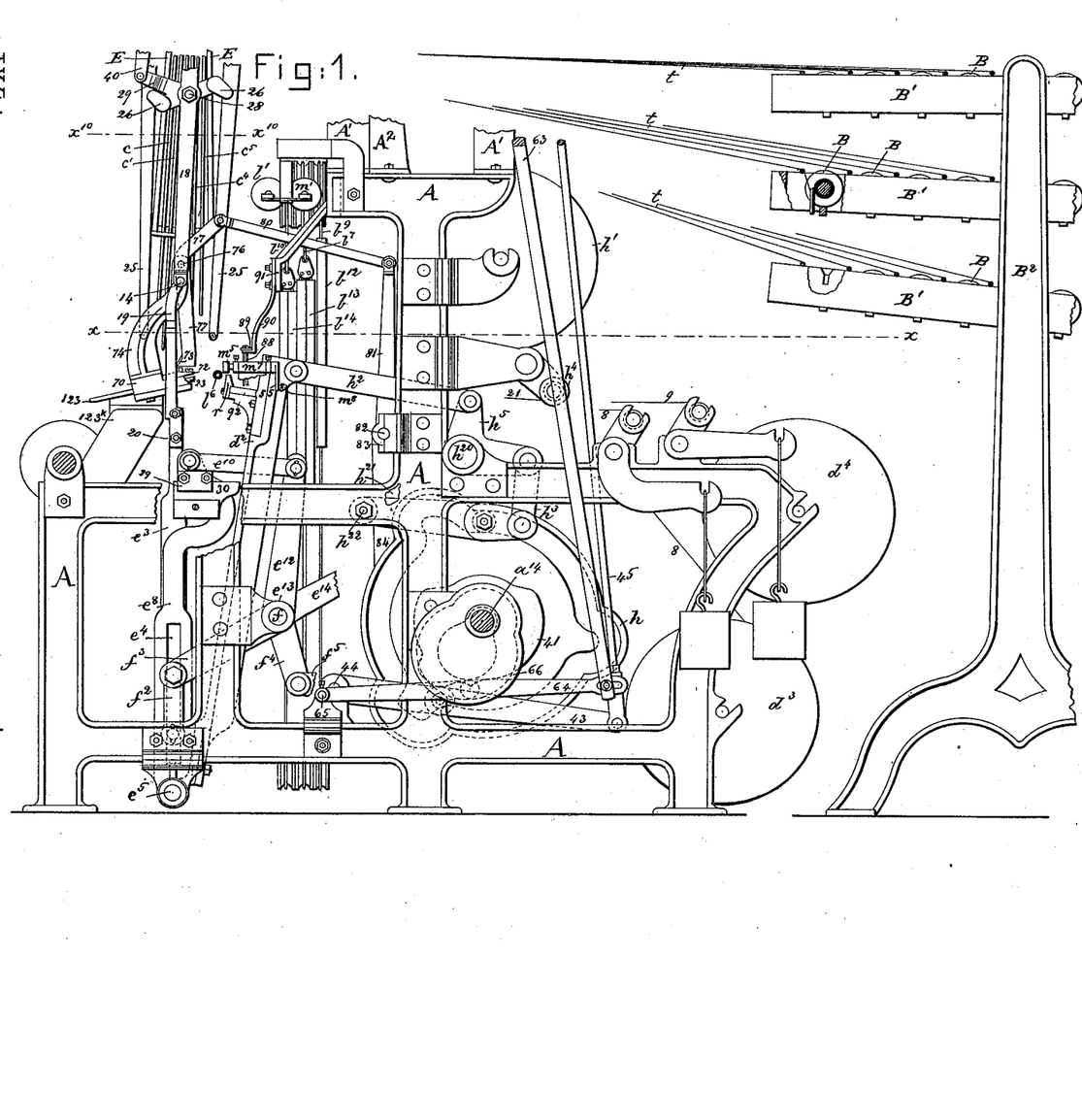
Figure 1 is an elevation of part of the right-hand side of the loom and spool-frame, viewing the former from the line $x^8\ x^8$, Fig. 2, part of the frame-work being broken away to show parts behind it, the jacquard, the upper parts of the rods and intermediate devices to actuate the jacquard, and the upper part of the evener mechanism, and carriages to hold the tuft carriers or needles being broken off. The parts so broken off are shown in Figs. 37 and 13, and in said Fig. 1 it will be noticed that the spool-frame is brought close up to the rear side of the loom, without, however, altering the angle at which the tuft-warp threads leave their spools. Other figures to be referred to show the tuft-warps introduced into the carriers or needles.

The Jacquard machine shown in Figs. 13 to 19 is not of our invention, but is commonly in use in Brussels and Wilton carpet looms, with the exception that the top board, 50, is made vertically movable. Instead of the particular Jacquard machine herein shown, any other suitable or well-known head may be used. The frame-work $A^5$ of the Jacquard machine is elevated above the loom-frame, and is herein shown as supported on a suitable frame-work, A', but partially shown in Fig. 1 erected on the loom-frame A. The shaft $a^{14}$ has a cam, 41, (shown in full and dotted lines, Fig. 1,) which acts against a roller-stud on a lever, 43, pivoted at 44 just within the right-hand side frame of the loom, the said lever being joined by the connecting-rod 45 with the arm 46 of the rock-shaft 47, thus vibrating the latter, so that its arms 48 at opposite sides of the rock-shaft, through links 49, connected with the top board, 50, by means of the slides 51, are made to reciprocate the said top board. The top board has connected with it and supports the jacquard-cords D, all the said cords and their attached needles being raised in unison with the top board whenever the distance between the top board and the trap-board 58 is greater than the distance between the top board and the knots 52 in the cords D, the said top board, as it is lowered in excess of the descent of the trap-board 58, lowering each one of the needles of each series of needles which is connected with a jacquard-cord the knot 52 of which is not caught above the trap-board, the needles so lowered below the others being selected for use in making the next row of tufts. The needles connected with cords the knots of which are not caught by the trap-board descend until their projections 12 rest on the carriages. Preparatory to inserting a row of tufts, the top board is lifted to lift the knots 52 of all the cords D above the trap-board 58, lift the projections 12 of the needles above the carriages, and bring all the needles up into their highest position. This being done, the cylinder 53, provided with a chain of usual pattern-cards 54, is moved against the ends of the jacquard-needles 55, of usual construction, so that the cords D extended through the eyes of the said needles 55, which are moved by the pattern-card then operative, will be moved so as to place their knots 52 over the contracted parts of the elongated holes in the trap-board. The top board will then commence to descend, while the trap-board remains at rest, and the cords so moved into the narrow parts of the holes of the trap-board will rest upon and be suspended from the trap-board, and all the tuft-yarn carriers or needles connected with the cords so suspended from the trap-board will be held with their lower ends at the same level; but the knots of such of the cords as are not trapped by the trap-board in the first portion of the descent of the top board will pass below the trap-board, and the tuft-yarn carriers or needles connected therewith and suspended from the top board by the cords D will descend in unison with the top board until the projections 12 of the said carriers or needles rest upon the carriages. After the eveners 16× have acted upon the carriers or needles so dropped and placed them in line, the top board and trap-board descend in unison with the arms 18, the slides 56, with which the trap-board 58 is connected, being in turn joined by rods 57 with the rod 17×, before referred to. The cylinder 53 is moved horizontally by the slides 59, one at each side of the jacquard-head, and the said slides are connected with arms 60 of a rock-shaft, 61, having an arm, 62, connected by link 63 with a lever, 64, pivoted at 65, (see Fig. 1,) having a roller-stud acted upon by a cam, 66, fast on the shaft $a^{14}$. (See Fig. 1.) The shaft of the cylinder 53 has near its left-hand end (see Fig. 15) a lantern-wheel, 223, which at the proper time during its outward movement, or in the direction of the arrow 222, Fig. 13, will be engaged by a hook or pawl, 226, of usual construction. (Shown in detail in Fig. 13ª.) The breast-plate has bolted to it at its ends a bed-plate, 70, upon which bed-plate is secured the stationary member or blade 72 of the shears employed to cut the tuft-yarns to form tufts, the said blade in practice being made adjustable vertically at each end by suitable headed bolts, 102, and set-screws, 103, (see Figs. 4 and 22ª,) to enable the said blade to have its cutting-edge placed at the proper level to correctly co-operate with the movable blade 73, to be described. The bolt 102, passed loosely through a hole in the blade 72, is screwed into a lug of the bed-plate 70; but the thread of the screw 103 engages threads lapped into the blade, and the end of the screw rests upon the said lug. The bed-plate 70 has bolted to it by bolts 75 the uprights 74, upon the upper ends of which latter, at 76, are pivoted the arms 77 of an irregular frame composed of said arms and a bar, 78. The movable blade 73 is bolted to the bar 78. The arms 77 of the bar 78 are so shaped between the pivotal points 76 thereof and the bar 78 as to place the said arms in different planes, so that in the vibration of the said frame one end of the blade 73 comes against one end of the stationary blade, and thereafter from such point on the edges of the two blades gradually come together. The upper ends of the arms 77 are connected by links 80 with arms 81 of a rock-shaft, 82, held in suitable bearings, 83, on the frame-work, the said rock-shaft having a third arm, 84, provided with a roller-stud, 85, which is acted upon by a grooved cam, 86, on the shaft $a^{14}$. (See Fig. 4.) The warp-threads 8, 9, and 21, on their way to the breast-plate 123, are passed between warp-guides 88, made by inserting a number of pins in a bar, 89, supported at its ends by the rigid arms 90, bolted to a cross-girt, 91, of the loom-frame, the lower ends of the said pins terminating near the top of the plate 92 of the lay-swords $d^2$. (See Fig. 1.) The reed $r$ is composed of a series of short stiff dents or fingers, as shown best in Figs. 1 and 3 and in the diagrams, Figs. 29 to 36, which enter the spaces between the warp-threads to beat up the weft, and then withdraw from between the warps, the said dents in the loom herein described being operated to beat the weft into place three times during each round of the cam-shaft, as in the patent referred to. The bar having the projecting dents or teeth $r$ is bolted to a cross-beam, 92, properly bolted to the lay-swords. The tuft-yarns $t$ coming to the needles will preferably be guided between guide-wires 104, secured to uprights 105, bolted at 106 to the loom-frame, the said wires 104 being extended across the loom at the rear of the carriages. These guide-wires are shown only in Fig. 24.

In the invention herein described, in which it has been stated that our improvements are incorporated with parts but partially shown, they being common to the Patent No. 245,259, referred to, we desire it to be understood that we have entirely dispensed with all the needle-carriages therein described, all the chains for moving the said carriages, all the devices for moving the chains, and all the pile-wire mechanism and the tuft-depressing mechanism, and instead of some of the cams therein described we have added other cams, which are herein fully shown; but we do retain substantially the same mechanism for introducing and locking the weft-thread, for controlling the main and stuffing warps, and for operating the lay and the shed-forming mechanism; and herein, where we have referred by letter to a part as being the same as shown in the said patent and have not shown means to operate the said part, it will be understood that the said part may be operated substantially as shown in the said patent.

The operation of our improved tuft needles or carriers in inserting a tuft will now be described, referring to Figs. 29 to 36. After the needles to be used for the production of any transverse row of tufts have been lowered so that they are supported one needle on each carriage, as described, the eveners are brought toward each other, and in such movement they act upon the said dropped or selected needles and place them all in a row as a set of needles to form the row of tufts. The carriages and eveners derive their support from the rod $17^\times$, and after the dropped needles are all in line, as stated, the lifters $e^3$ are lowered or permitted to descend, thus lowering the rod $17^\times$, and with it the carriages, needles, and eveners, the latter holding the set of dropped needles all in the same line, while the points of the needles are thrust between the warp-threads and while they are thereafter elevated from below the warp-threads and while the tuft-yarns are being cut off. While the carriages and evener mechanism are being so lowered together to thrust the dropped needles between the warp-threads, the top board, 50, also descends in unison with the carriages. The top board is moved by the links 49, connected with the arms 48, and the trap-board by the rods 57, connected with the rod $17^\times$, which is raised and lowered in unison with the lifting devices $e^3$. (See Fig. 22.) The movements of the top board and trap-board are in unison for most of the time, the difference in speed being while near the highest positions, such difference being merely sufficient to enable the top board to lift the lowered needles up to the level of the needles supported by the cords D, which are suspended from the trap-board, and also place the knots of all the cords above the trap-board, to permit the said cords to be moved freely by the needles of the jacquard.

To illustrate the operation of our invention we shall refer to diagrams Figs. 29 to 36.

Figure 29:
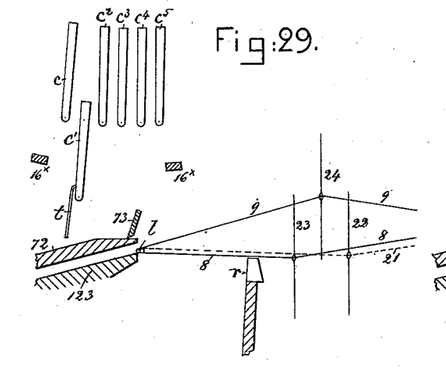
Figs. 29 to 36, inclusive, are detail views to illustrate different positions of the needles, eveners, comb or beater, breast-plate, and cutting mechanism employed in the manufacture of tufted fabrics in accordance with our invention.
Figure 30:
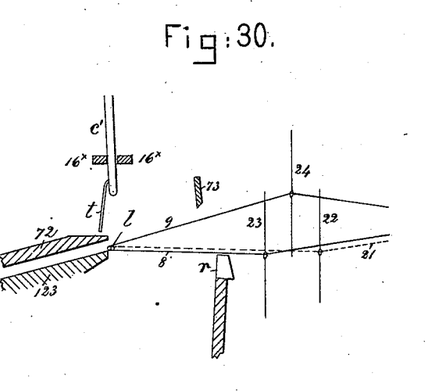

In Fig. 29 one of the needles is shown as having been dropped below the fellow needles of its series or the needles in the same carriage, and it will be supposed that the needle so dropped contains a tuft-yarn, $t$, of the color desired for the tuft to be put in by that series of needles, it being understood that the series of needles correspond in number with the number of tufts in each transverse row of tufts, and that one needle of each series of needles is lowered prior to introducing or making each separate transverse row of tufts to be made. The proper needles having been lowered from each series of needles to produce tufts of the desired color, the eveners $16^\times$ are closed together, and, acting against the dropped or selected needles, bring them all in the same line above the warp, the action of the eveners on the needles moving the carriages in one or the other direction, according to which needle of each series of needles is so lowered. Fig. 30 shows the eveners so closed upon the dropped needles, and in practice it will be understood that such needles correspond in number with the number of tufts to be made across the fabric.

To avoid confusion on the drawings we have omitted from Fig. 30 to Fig. 36 all the needles of the series of needles except the particular ones dropped to produce the tuft. All the dropped needles are operated in unison, so the description of the movement of one will suffice for all.

Figure 34:
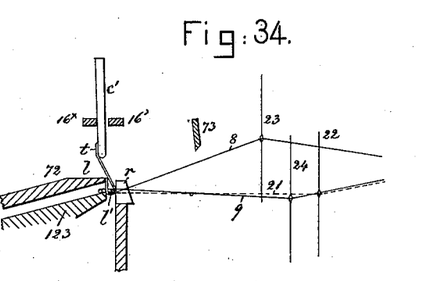
Figure 35:
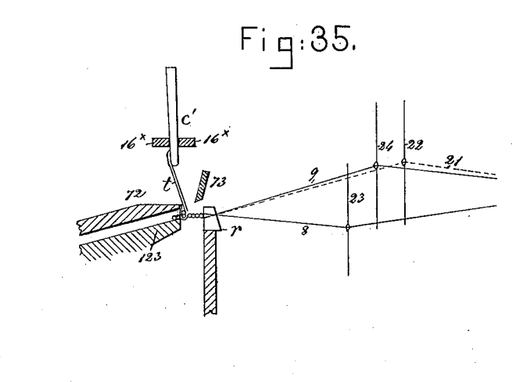
Figure 36:
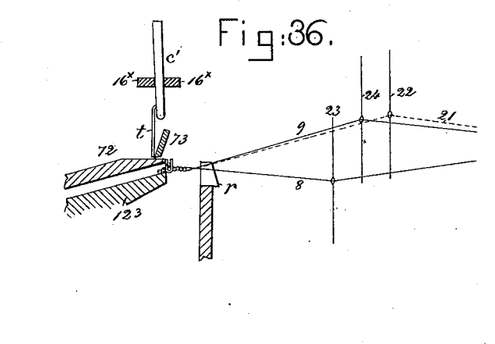
Figure 37:
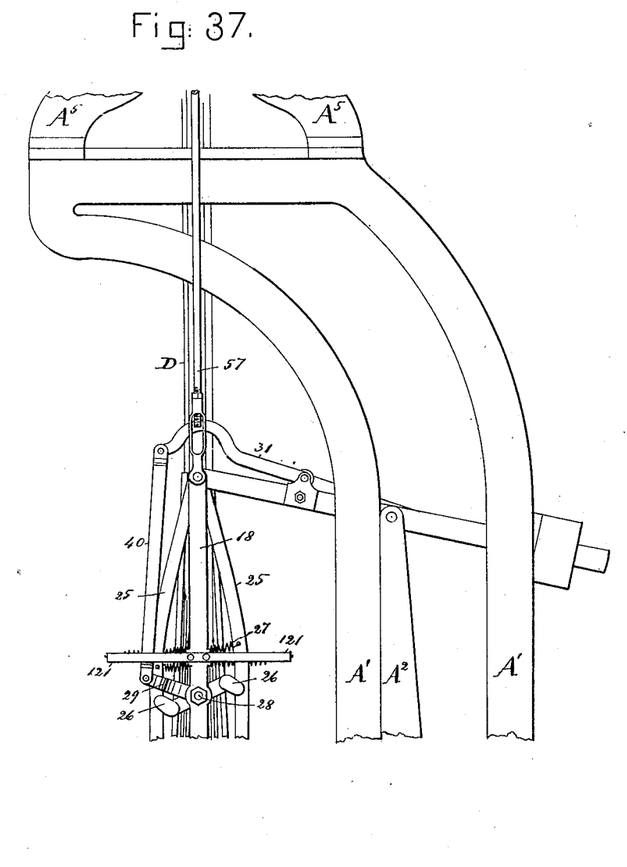
Fig. 37 is a partial right-hand side elevation of the loom, the said figure being made chiefly to show the parts between the top of Fig. 1 and the under side of Fig. 13.

Referring to Fig. 29, the movable cutting-blade 73 stands in the position occupied by it when the last row of tuft-yarns were cut off. Between the cutting off of the said yarns and the raising of all the needles, the selection of one from each series for the next row of tufts, and the closing of the eveners on the dropped or selected needles, the blade 73 is thrown back to its open position, as in Fig. 30. After the eveners bring the set of tuft-needles in the same line as in Fig. 30, the top board, trap-board, evener mechanism, and needle-carriages are lowered in unison to cause the passage of the set of dropped needles between the warp-threads, a shed having been formed by lifting the warp-threads 9 and lowering the warp-threads 8 and the stuffing-warps 21, a doubled pick of filling, $l$, having been previously placed between the warps 8 and 21. The needles are passed down into this shed from the position Fig. 30 to that denoted in Fig. 31, and by the action of the links $e^{10}$ and arms $e^8$, the lifting devices $e^3$, and bars 18 19, the evener mechanism as it is lowered is carried diagonally backward away from the edge of the breast-plate 123 until the tuft-yarn, at the point where it issues from the needle or tuft carrier, is sufficiently below the warps 8 and 21 for the passage of the weft-carrying needle into the shed above the tuft-yarns laid in the said shed, substantially as in Fig. 32, and a doubled pick of weft is left in the shed referred to, as represented by the letter $l'$. The needles, eveners, &c., now commence to rise and move forward toward the breast-plate, (see Fig. 33,) the needles drawing the tuft-yarn up, as represented in Fig. 34; but while passing from the position Fig. 33 to that shown in Fig. 34 the shed is changed, and the comb or reed $r$ is caused to beat up the tuft-yarn and force it, with the weft $l'$, close up to the weft $l$. The shed is then again changed, warp 9 and the stuffing-warp 21 being lifted and warp 8 lowered, as in Fig. 35, and in such new shed we introduce two doubled picks of filling, and the comb or reed beats the same in, as shown in Fig. 35, and thereafter the blade 73 is thrown forward, cutting off the tuft-yarn, as in Fig. 36, leaving a row of tufts of uniform length. In practice the final beat up of the reed, completing the formation of each row of tufts, causes the doubled weft $l'$ to pass above the doubled weft $l$, making a fabric such as represented in Fig. 46 of our patent referred to. The tufts having been cut off, the eveners are opened and the needles are raised, the shed is changed, and the needle having a yarn of the proper color is dropped from the series of needles of each carriage, bringing the parts again into the position Fig. 29. The woven fabric is supported on the breast-plate, the inner edge of which extends substantially to the cloth-making point, the edge of the stationary blade 72 of the tuft-cutting mechanism being nearly in the same line, and the comb or reed beats up the tuft to the inner edge of the said plate and blade, and thereafter the movable blade advances and cuts the tuft-yarn, leaving both legs of the tuft of uniform length.

We have herein used the term "jacquard," meaning thereby to include a mechanism under the control of a pattern-surface, preferably a series of cards, and capable of raising and lowering at will any one of a series of cords—such as used in Jacquard looms to form sheds; but herein the said cords which are controlled by the said mechanism do not aid in forming the shed, but merely act to select or raise and lower the tuft-yarn carriers or needles of each series of tuft-yarn carriers or needles which are to be used in the different rows of tufts; and we desire to hold as within the scope of our invention any usual or known mechanism whereby the tuft-yarn carriers or needles in series, each supplied with a yarn taken from a separate spool, may be selected and placed in such position as to present in a row the needles which contain the tuft-yarns of the colors which it is desired shall be used in the tufts of the next row of tufts.

We have shown different forms of carriages and tuft-yarn carriers therein; but the said parts are substantially alike in all essential features, and each carriage has a series of tuft-yarn carriers or needles therein arranged in a row one behind the other, each carrier or needle receiving a separate yarn, each carriage being movable in the direction of the length of the warp or the direction of weaving, to thus enable any desired needle of each carriage to be placed in operative position to furnish a tuft-yarn of the desired color.

We have herein shown the tuft-yarns as taken from separate spools with heads; but it is obvious that the said tuft-yarns might be taken from cops or bobbins such as employed to hold filling in loom-shuttles, the said bobbins being large and containing very long lengths of yarn, the yarn being taken therefrom without rotating the bobbins.

We have herein shown a series of carriages made movable in the direction of the length of the warp-threads, each carriage having a series of vertically-movable tuft-yarn carriers or needles; but we have not herein claimed the said carriages and tuft-yarn carriers or needles irrespective of the movement of the said carriers or needles in the carriages, as the said carriages, when moved automatically in substantially a horizontal direction, or in the direction of the length of the warp-threads and near the said threads, are made the subject-matter of claim in our application, Serial No. 179,213, filed October 7, 1885; and so, also, the said carriages when provided with needles or carriers, but which are not made movable in the said carriages vertically, are made the subject of claim in our application, Serial No. 142,487, filed September 8, 1884. In this case we have also shown guides for the tuft-yarns, which guides are located above the said carriages; but we have not claimed the said guides broadly, or irrespective of the tuft-yarn carriers or needles, for tuft-yarn guides located above the said carriages and not forming part of the carriages are made the subject-matter of claim in our application, Serial No. 179,213, filed October 7, 1885, wherein we have shown the said guides entirely disconnected from and independent of the carriages.

Herein we have shown the carriages as moved horizontally for different distances by the action of evener mechanism directly on the selected tuft-yarn carriers or needles, and claim is not herein made to such carriages when made movable horizontally for different distances in the direction of their length by means acting directly upon the carriages or parts connected therewith other than the selected needles, for carriages so moved are made the subject-matter of claim in our aforesaid application, Serial No. 179,213, filed October 7, 1885.

In the aforesaid application, Serial No. 142,487, filed September 8, 1884, we have also shown and claimed a series of carriages arranged side by side and means to move them automatically for varying distances, and a series of tuft-yarn carriers arranged therein one behind the other, combined with cutters or blades to cut the tuft-yarns and with nippers to seize the tuft-yarns and carry and place the same between the warps.

In another application, Serial No. 192,520, filed February 19, 1886, we have shown a series of carriages and tuft-yarn carriers or needles such as herein shown as combined with a comb to act upon and turn the ends of the tuft-yarns up about the weft and between the warps.

We claim—

1. A series of independently-movable carriages corresponding in number with the tufts to be introduced in a transverse row of tufts, and a series of independent tuft-yarn carriers or needles therein, and means to support the carriages, combined with means to select and lower one tuft-yarn carrier or needle in each of the several carriages, according to the number of tufts desired in the transverse row of tufts to be made, substantially as described.

2. A series of independently-movable carriages corresponding in number with the tufts to be introduced in a transverse row of tufts, a series of independently-movable tuft-yarn carriers or needles in each carriage, and means to select and lower a single carrier or needle in each carriage, combined with an evener mechanism to act upon and place the selected and dropped tuft-yarn carriers or needles in line, and with means to lower and raise the carriages, whereby the selected and dropped carriers or needles held in a row across the fabric may be made to present the tuft-yarns to the warp, substantially as described.

3. In combination, shed-forming mechanism to form sheds in the warp-threads, a series of carriages made movable in the direction of the length of the warp-threads, a series of independently-movable tuft-yarn-carrying needles mounted in each of the said carriages, means to select and lower any one needle in each series of needles, an evener mechanism to bring all the lowered needles into line, and means to raise and lower the carriages and needles to enable the lowered needles to present the tuft-yarns in the warp-shed, substantially as described.

4. The series of independent carriages and means to support them side by side, and a series of independently-movable tuft-yarn carriers or needles mounted in each of the said carriages, one behind the other, in the direction of the length of the warp, and provided with projections to rest on the carriages when lowered, and with yarn delivering and receiving eyes, the receiving-eyes for each series of needles being arranged thereon at different distances from their delivering-eyes, combined with a jacquard mechanism to select and lower one needle from each series of needles, according to the color of tuft to be made by a needle in each carriage, substantially as described.

5. The series of independent carriages, means to support them side by side, a series of independently-movable tuft-yarn carriers or needles mounted in each of the said carriages, one behind the other, in the direction of the length of the warp, and means to select and lower one needle from each carriage beyond or below the fellow needles in the carriage holding it, combined with evener-bars, notched at their edges to embrace the needles which are selected and dropped, and with means to actuate the said evener-bars to bring the selected and dropped needles into line across the warps into and with which the tufts are to be incorporated, substantially as described.

6. The breast-plate to support the fabric after the same has been woven, the blade 72, arranged immediately above it, with its edge close to the cloth-making point, and means, substantially as described, to support the said blade, combined with the movable blade 73, and means, substantially as described, to actuate it to cut the tufts to proper length, substantially as described.

7. A series of independent carriages arranged side by side and corresponding in number with the tufts to be introduced in any one transverse row of tufts, a series of independent tuft-yarn carriers or needles mounted therein, a jacquard mechanism to select the said needles singly, according to which needle of the series of needles in each carriage is to be employed, and a spool-support to hold the spools on which the tuft-yarns are wound, each carrier or needle being supplied with a yarn from a separate spool, combined with mechanism to place the selected needles in a line transversely across the warp, the said needles containing yarns of the color demanded for the next row of tufts to be made, each series of needles in each carriage presenting but one of its needles on the said line, and that according to the color of the tuft to be produced by it, substantially as described.

8. A series of carriages arranged side by side across the loom, means to raise and lower the said carriages with relation to the plane of the warp, and a series of tuft-yarn carriers or needles arranged in each of the said carriages, one behind the other in succession, and means to select the said needles, combined with means to effect the movement of the carriers or needles and carriages in the direction of the length of the warp, whereby any desired one of the carriers or needles of each series may be brought into line to constitute a transverse set of carriers or needles to furnish the next transverse row of tufts, the movements of the carriages being for different distances, according to the particular needle of the series to be employed in the formation of the next transverse row of tufts to be made, substantially as described.

9. A series of spools, each containing one yarn, a series of independently-movable carriages arranged parallel with the warp-threads, and a series of tuft-yarn carriers or needles, arranged one behind the other, in each of the said carriages, each needle being adapted to receive one of said yarns, and means to select the said needles, combined with means for moving the said carriers or needles and the carriages over different distances in the direction of the length of the warp-threads, whereby any desired one of the carriers or needles of each carriage may be brought into position to have the yarn carried by it used in the formation of the next transverse row of tufts, substantially as described.

In testimony whereof we have signed our names to this specification in the presence of two subscribing witnesses.

GEO. CROMPTON.
HORACE WYMAN.

Witnesses:
J. A. WARE,
W. H. SIGSTON.